United States Patent Office 2,713,544
Patented July 19, 1955

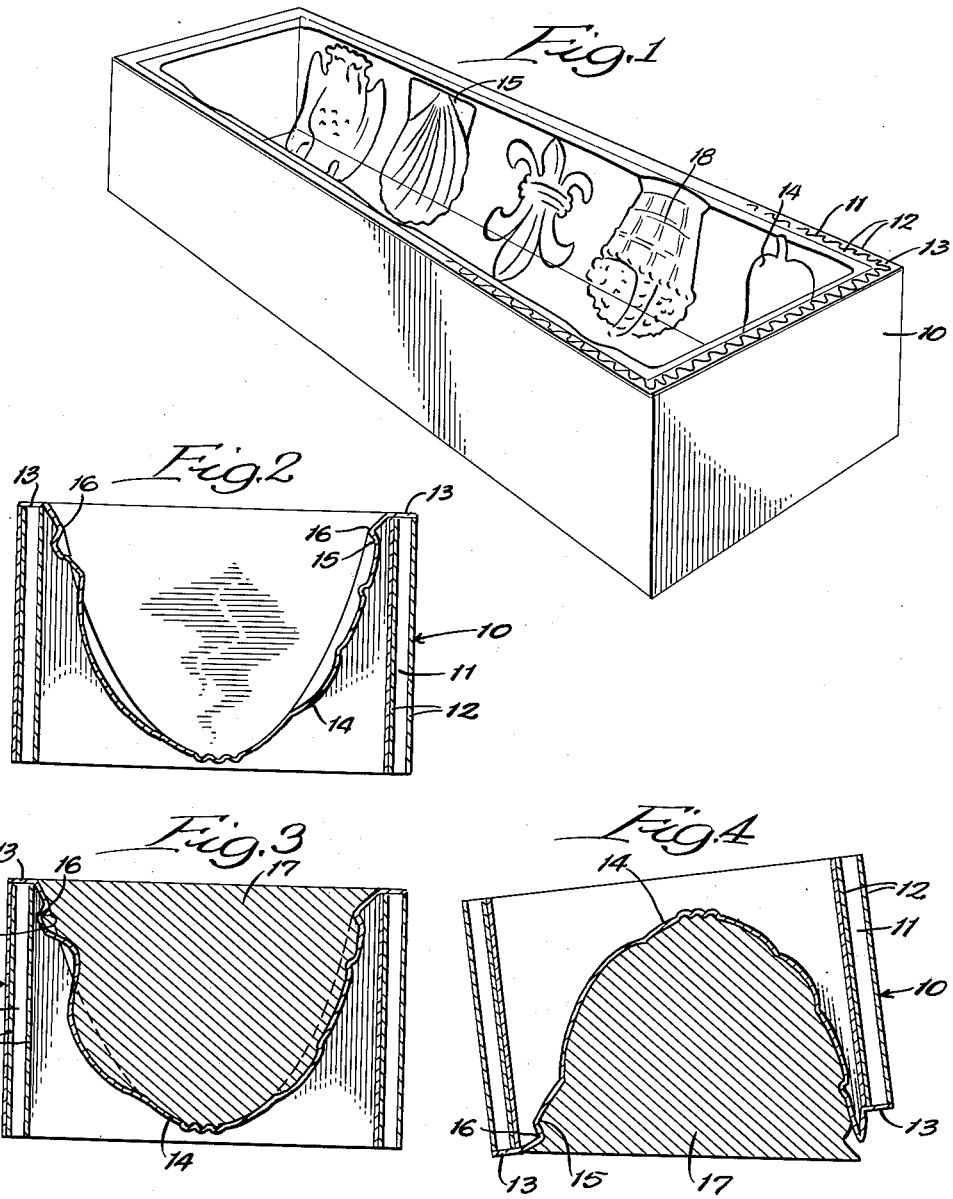

2,713,544

SOFT PLASTIC FOOD PACKAGE

Leo Peters, Evanston, Ill.

Application March 26, 1952, Serial No. 278,576

The portion of the term of the patent subsequent to March 17, 1970, has been disclaimed 1 Claim. (Cl. 99—171)

This invention relates to a mold package for soft plastic bodies or materials. More particularly, the invention relates to a mold package for soft plastic foods or other soft plastic materials and providing a non-separable cavity-die structure which will permit said materials to be molded and removed from said cavity in shapes which project substantially inward or outward from the line of die taper, the die being formed of a flexible, non-elastic and non-stretchable film. The package and its unique cavity are exceptionally useful in molding and removing intact in molded form such easily bruised soft plastic foods as butter, margarine, processed cheese, ice cream, prepared gelatines, etc. It is also useful for molding and removing a wide variety of other products and substances such as cookies, candies, soap cakes, glass, metal and plastic objects, etc., molded into taper-interrupted or taper-undercut shapes.

Within the broad art of molding and die-casting it is axiomatic that where a non-separable die is used for molding a product and where neither the die nor the product to be molded by the die are inelastic at the removal temperatures, then the die must have a positive taper (not matter how slight) at all points on its surface to permit the molded product to be removed intact. In such instances it is impossible to mold and remove from a die shapes which interrupt or undercut the descending line of taper. Furthermore, when soft products such as butter, margarine, ice cream, etc. are molded into such taper-interrupted shapes, it is undesirable to use an elastic-walled die-cavity because of the ease with which even stripping pressures from the elastic walls can dent and bruise such molded products.

Therefore, the possibility of molding soft plastic foods into shapes having interrupted and undercut lines of taper within a non-separable and non-stretchable die cavity and then removing them intact from such a cavity has, in the past, appeared hopeless.

An object of the present invention is to provide a safe and inexpensive method for molding plastic foods, etc. into shapes having interrupted and undercut lines of taper within a non-separable, non-stretchable package cavity while permitting easy removal from the package without disfiguring the shaped food, etc. A further object is to provide in such a structure a tapered package cavity having undercut designs on its walls with the undercut design located at a distance from the top edge of the cavity and preferably at a distance equal to or greater than the depth of the nearest undercut design. Another object is to provide a relatively thin, non-stretchable, highly flexible, pre-formed, taper-interrupted-and-undercut film-package-cavity having the ability to peel and flex itself around the projecting undercut portions of its molded contents without marring or bruising them when said contents are removed from the cavity. A still further object is to provide a non-stretchable film for a taper-interrupted-and-undercut package cavity which is relatively non-tacky in contact with soft plastic foods so that it will peel free with ease from its molded contents without breaking loose pieces of the mold, especially at the point where the undercut projects. Still another object is to produce a structure for a package cavity which has undercut projections, from a thin, flexible, non-stretchable film which can be stripped from its molded contents by tipping and peeling loose the cavity from one side of its base so as to produce a larger cavity periphery at the point of the undercut than would be the case if the cavity were peeled loose uniformly from the molded base upward. Yet another object is to produce a flexible, non-stretchable package mold structure capable of turning inside out while peeling off around an undercut protrusion on the taper of the molded body. Other specific objects and advantages will appear as the specification proceeds.

The invention is shown in an illustrative embodiment by the accompanying drawing, in which—

Figure 1 is a perspective view of a package container embodying my invention; Fig. 2, a transverse sectional view; Fig. 3, a view similar to Fig. 2 but showing the package filled; and Fig. 4, a view similar to Fig. 3 but showing the package inverted and the molded body being removed therefrom.

In the illustration given, 10 designates a support which may be in the nature of a perimetric box. In the illustration given, the walls of the box are formed by corrugated paper 11 supported by the paper sheets 12. It will be understood that any suitable support may be provided, including, for example, a thin, perimetric ring to which the cavity film may be fastened with the ring in turn resting upon a support whose height is at least equal to the depth of the cavity.

Resting on the top of the box or support 10 is a flexible, substantially non-stretchable film 13 which may be formed of plastic or other suitable material. I prefer to employ a plastic which may be drawn into a suitable mold form through the application of heat, etc. and then sets into a non-stretchable condition. By "non-stretchable" or "inelastic," I mean a material which, under the ordinary conditions of supporting the body of plastic food or other material and under the conditions which will be later described for removing the molded product, does not stretch to any substantial extent. The film 13 has a central mold portion 14 formed to provide a cavity for receiving the plastic product. In the molding operation, I form laterally-extending recesses 15 having undercut shoulders there-above.

In Figs. 3 and 4, the cavity provided by the mold portion 14 is filled with a soft plastic food or product 17. This product becomes firm and after it is in molded form it is ejected, as is illustrated in Fig. 4.

In the operation of the structure, the side walls of the film cavity portion 14 are provided with a number of designs 18 which provide a series of inwardly and outwardly-extending recesses 15 and at various points provide undercut shoulders 16. Ordinarily, when a soft plastic body is cast within such a mold to form a firm molded body, it is impossible to remove the body withmolded body, without marring the mold lines thereof unless the mold is a divided mold or unless the film is a stretchable film. A divided mold presents a serious disadvantage, particularly where it is necessary to seal the parts thereof in molding a product which is liquid at the time of filling. Further, a stretchable mold is unsatisfactory because it is found that where such a mold is manipulated in the removal of a molded product which is delicate, such as butter, margarine, etc., it is substantially impossible to avoid a deformation of the molded product.

I have discovered that where the mold consists of a very thin, flexible but non-stretchable plastic material, it is possible to form in the side walls of the film mold a variety of designs forming undercut shoulders and yet upon reversing the mold and flexing it slightly, to effect a removal of the molded product without destroying any of the delicate mold lines thereof. In forming the mold, I prefer to have a top portion of the mold free of such undercut shoulders, so that at least a portion of the molded product can be ejected from the mold before reaching the undercut shoulders. The first undercut shoulder in the side wall should be a spaced distance from the top of the mold and, as already stated, I prefer that the undercut design or shoulder be located at a distance from the top edge of the cavity which is at least equal to the depth of the undercut.

After the mold has been filled as illustrated in Fig. 3 and then cooled or otherwise treated to effect a firming of the molded body, it is now possible to eject the molded body without injuring its mold lines through the following procedure. I prefer to invert the container, as illustrated in Fig. 4, and to press gently upon the bottom of the film, if this is necessary, to cause the molded body to move downwardly, carrying with it the film to a position below the edge of the support 10 to which the film 13 is secured, as illustrated in Fig. 4. At this point, as the film depends from the bottom of the support, it is found that the film will peel around the undercut shoulders and protrusions, and free itself from the molded body without marring any portion thereof. Removal is facilitated by slightly tilting the package, as illustrated in Fig. 4, so as to first free the interlocked or undercut shoulders on one side. The other side may then be tilted to free the interlock on the other side. Thus a rocking movement of the package is desirable with certain structures in freeing the mold lining from the molded product. While this operation is desirable, it is not necessary, and where the undercut shoulder lies within the side wall a substantial distance from the bottom of the support when it is inverted, the molded product can be advanced a very substantial distance below the lower edge of the support to provide depending film portions which strip easily around the undercut shoulders, and permit the removal of the molded delicate material intact.

In the molded structure, as illustrated in Figs. 3 and 4, it will be noted that the cavity or mold cup is generally tapered in cross-section and the undercut shoulders and protrusions along the sides forming the designs are still within the width of the mouth of the cavity. When the film, therefore, is gradually turned inside out, the molded body can pass readily through the top of the support and as the film near the bottom edge of the inverted support feeds forwardly with the molded product being ejected, there is a lateral pull of the film against the material being ejected so as to cause the film to peel outwardly and away from the undercut shoulders without disturbing such shoulders. By providing a space between the top of the support and the first undercut shoulder, I enable the molded product to be moved a substantial distance to bring a portion of the cavity film 14 past the bottom of the inverted support so that the above described peeling action can occur before the first undercut shoulder is encountered.

In the structure described, it will be noted that the cavity film 14 has no rigid backing but is suspended freely in air with only its top edge supported. Thus nothing can hinder the complete flexing of the cavity wall 14. The film is relatively thin, being preferably .002 inch or less in thickness, and sufficiently lacking in stiffness so that it will not bruise delicate molded foods, etc. when stripped off. Further, the film cavity can make a 180° flex easily and without noticeably denting the molded product. The cavity film is relatively non-tacky, so that even delicate protruding portions of the molded product will release from the film without breaking. With the structure shown, the thin cavity can be peeled loose from the molded product by starting the peeling operation from a single portion of the base rather than from the entire base, and the protruding portions never create a diameter or diagonal distance within the mold greater than the diameter or diagonal distance within the plane of the base of the mold.

For molding soft plastic foods such as butter, margarine, ice cream, pastry, bread doughs, etc., which are flowable at or below room temperatures, I prefer to use films such as cellulose acetate, cellulose butyrate, chlorinated rubber, and other well-known thermoplastic films. For molding products and substances which are flowable above room temperatures, such as processed cheese, soap, chocolates, etc., such films as polyethylene-glycol-terephthalate and unplasticized vinyl-chloride-acetate, are particularly well suited. It will be understood, however, that a variety of other plastic materials may be employed.

From the foregoing, I believe that the seemingly impossible and heretofore unaccomplished feat of molding within a non-separable, non-stretchable cavity shapes which undercut the cavity's line of taper, has been accomplished in a simple, surprising and effective manner, making it possible to mold soft plastic easily-dentable foods such as butter, margarine, etc., and to remove the same without marring the mold lines thereof.

While in the foregoing specification, I have set forth specific structures and steps in considerable detail for the purpose of illustrating embodiments of the invention, it will be understood that such details may be varied widely by those skilled in the art without departing from the spirit of my invention.

I claim:

A soft plastic food package, comprising a perimetric support, a thin, flexible but non-elastic plastic film attached to the upper portion of said support and extending downwardly within said support to provide a mold cavity therein for molding a soft plastic food body, the film portions providing the side walls of said cavity tapering from the top of said cavity in a generally downwardly and inwardly direction, said side walls having sharply undercut shoulders spaced from the top of said cavity, the uppermost of said undercut shoulders being spaced below the top of said cavity by at least the depth of the undercut, and a soft plastic food body within said cavity and molded thereby to form undercut shoulders engaging the undercut shoulders of said side walls.

References Cited in the file of this patent

UNITED STATES PATENTS

| | | |
|---|---|---|
| 542,452 | Thurber et al. | July 9, 1895 |
| 1,776,622 | Errington et al. | Sept. 23, 1930 |
| 2,070,023 | Olsen | Feb. 9, 1937 |
| 2,468,697 | Wiley | Apr. 26, 1949 |
| 2,631,939 | Peters | Mar. 17, 1953 |